US012457116B2

United States Patent
Held et al.

(12) United States Patent
(10) Patent No.: US 12,457,116 B2
(45) Date of Patent: Oct. 28, 2025

(54) METHOD FOR SECURELY EQUIPPING A VEHICLE WITH AN INDIVIDUAL CERTIFICATE

(71) Applicant: MERCEDES-BENZ GROUP AG, Stuttgart (DE)

(72) Inventors: Albert Held, Neu-Ulm (DE); Viktor Friesen, Karlsruhe (DE); Daniel Meidlinger, Schechingen (DE); Matthias Dettling, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 509 days.

(21) Appl. No.: 18/019,883

(22) PCT Filed: Jul. 8, 2021

(86) PCT No.: PCT/EP2021/068938
§ 371 (c)(1),
(2) Date: Feb. 6, 2023

(87) PCT Pub. No.: WO2022/028806
PCT Pub. Date: Feb. 10, 2022

(65) Prior Publication Data
US 2023/0291574 A1  Sep. 14, 2023

(30) Foreign Application Priority Data

Aug. 7, 2020  (DE) .................. 10 2020 004 832.3

(51) Int. Cl.
*G06F 21/00* (2013.01)
*H04L 9/08* (2006.01)
*H04L 9/32* (2006.01)

(52) U.S. Cl.
CPC .......... *H04L 9/3263* (2013.01); *H04L 9/0825* (2013.01); *H04L 9/3247* (2013.01)

(58) Field of Classification Search
CPC ... H04L 9/3263; H04L 9/0825; H04L 9/3247; H04L 2209/84; H04L 9/3268
See application file for complete search history.

(56) References Cited

U.S. PATENT DOCUMENTS

| 10,237,077 B2 | 3/2019 | Winkelvos et al. |
|---|---|---|
| 10,328,874 B2 | 6/2019 | Haga et al. |

(Continued)

FOREIGN PATENT DOCUMENTS

| CN | 104579676 A | 4/2015 |
|---|---|---|
| DE | 102009009310 A1 | 10/2009 |

(Continued)

OTHER PUBLICATIONS

International Search Report and Written Opinion mailed Oct. 25, 2021 in related/corresponding International Application No. PCT/EP2021/068938.

(Continued)

*Primary Examiner* — Kendall Dolly
(74) *Attorney, Agent, or Firm* — PATENT PORTFOLIO BUILDERS PLLC

(57) ABSTRACT

A method involves a vehicle certification authority and a control device certification authority having a respective infrastructure for public keys based on an asymmetric pain of is established. The respective private key remains in the certification authority and the public key is distributed to the participants. The control device has initial cryptographic material by a control device-individual pair of keys being generated for the control device and the identity of the control device and its public key are transmitted to the control device certification authority, after which a control device-individual certificate is generated there for the transmitted data using the private key of the control device certification authority and transmitted back to the control device. The public key of the vehicle certification authority (Continued)

is stored in a tamper-proof manner in the control device. The vehicle identity belonging to the identity of the control device is determined and stored in a tamper-proof manner.

11 Claims, 1 Drawing Sheet

(56) References Cited

U.S. PATENT DOCUMENTS

| | | | |
|---|---|---|---|
| 10,425,398 B2 | 9/2019 | Tschache et al. | |
| 10,484,184 B2 | 11/2019 | Oguma et al. | |
| 11,606,213 B2* | 3/2023 | Takada | H04L 9/3073 |
| 2014/0149740 A1* | 5/2014 | Sato | H04L 9/006 713/158 |
| 2015/0113267 A1 | 4/2015 | Busser et al. | |
| 2017/0111178 A1* | 4/2017 | Winkelvos | H04L 9/3268 |
| 2017/0111353 A1 | 4/2017 | Tschache et al. | |
| 2018/0323977 A1* | 11/2018 | Hojsik | H04L 67/12 |
| 2019/0089546 A1* | 3/2019 | Garcia Morchon | H04L 9/0847 |
| 2021/0306135 A1* | 9/2021 | Chu | H04L 9/3247 |
| 2021/0359847 A1* | 11/2021 | Bartkowiak | H04L 9/0825 |
| 2022/0368539 A1* | 11/2022 | Wright | H04L 9/007 |
| 2024/0073037 A1* | 2/2024 | McFarland, Jr. | H04L 9/3268 |
| 2025/0106044 A1* | 3/2025 | Golden | H04L 9/3268 |

FOREIGN PATENT DOCUMENTS

| | | |
|---|---|---|
| DE | 102015220224 A1 | 4/2017 |
| DE | 102015220226 A1 | 4/2017 |
| DE | 102016119697 A1 | 4/2017 |
| EP | 3474488 A1 | 4/2019 |
| JP | 2016134170 A | 7/2016 |
| JP | 2018019415 A | 2/2018 |
| JP | 2018116400 A | 7/2018 |
| JP | 2019009509 A | 1/2019 |
| JP | 2019517228 A | 6/2019 |
| WO | 2017165828 A1 | 9/2017 |

OTHER PUBLICATIONS

Office Action created Jul. 27, 2021 in related/corresponding DE Application No. 10 2020 004 832.3.
Office Action dated Nov. 28, 2024 in related/corresponding KR Application No. 2023-7003330.
Office Action dated Mar. 7, 2025 in related/corresponding CN Application No. 202180056872.8.
Office Action dated Apr. 22, 2024 in related/corresponding JP Application No. 2023-507363.
Yushev et al., "The Overview of Public Key Infrastructure Based Security Approaches for Vehicular Communications," BW-Car Symposium on Information and Communication Systems (SinCom), Nov. 13, 2015.

* cited by examiner

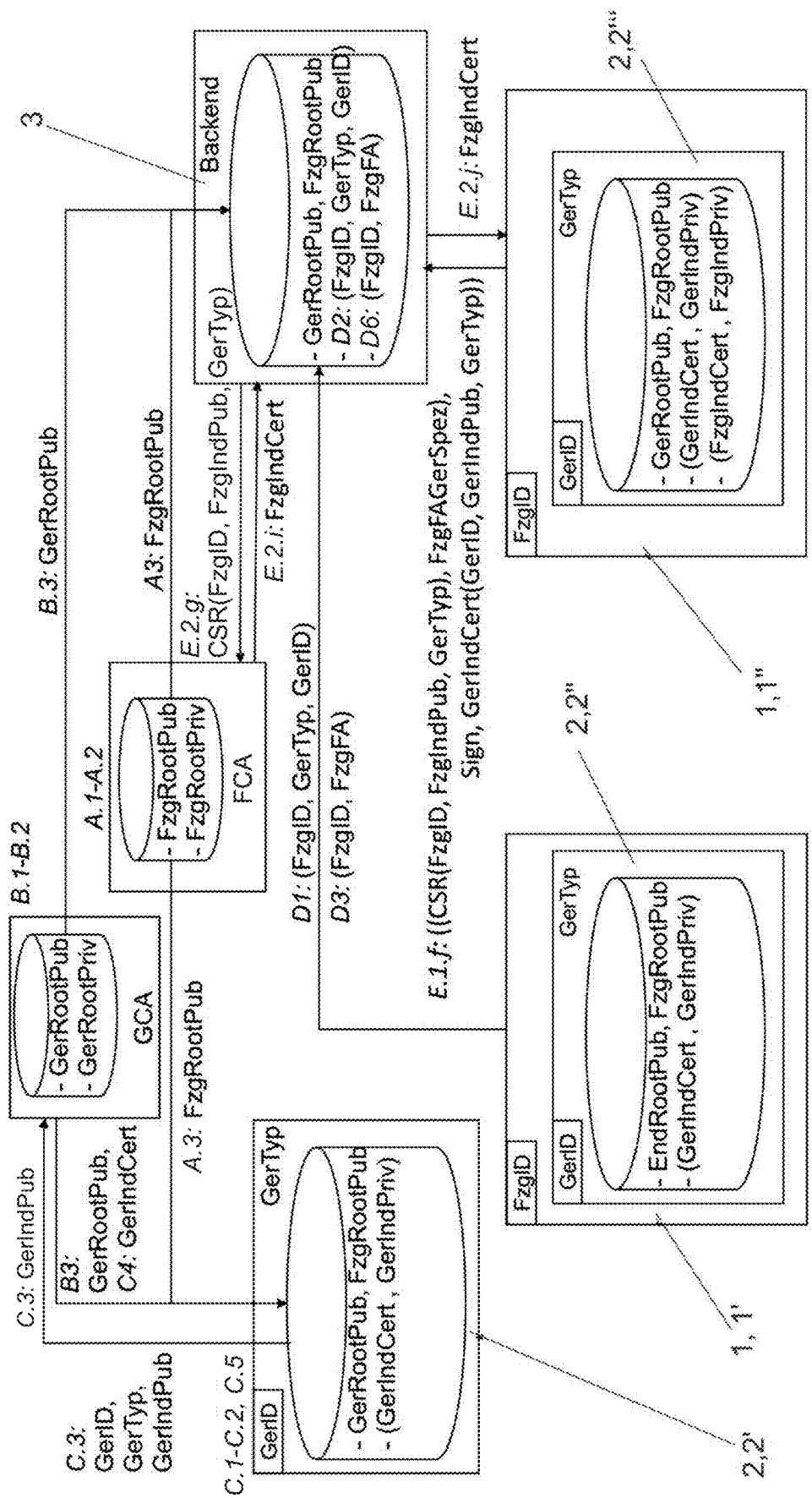

METHOD FOR SECURELY EQUIPPING A VEHICLE WITH AN INDIVIDUAL CERTIFICATE

BACKGROUND AND SUMMARY OF THE INVENTION

Exemplary embodiments of the invention relate to a method for securely equipping a vehicle with an individual certificate.

Modern vehicles are characterized by an increased amount of networking. The vehicles are not only connected to systems such as the world wide web but also to systems and servers operated by the vehicle manufacturer or OEM, for example a manufacturer's own application or a manufacturer's own server, which is often referred to as the vehicle backend. These are developed, marketed, and operated by the manufacturer exclusively for its own vehicle fleet. All this together is referred to as the vehicle ecosystem.

In practice, it is now the case that the diverse communication relationships between the individual system components within such a vehicle ecosystem give rise to a multitude of new interfaces and applications, all of which must be secured by suitable cryptographic methods, such as mechanisms and protocols, etc. This securing serves, on the one hand, to protect the privacy of the vehicle user and, on the other hand, to prevent external intervention in the data traffic, which, in particular in the transmission of data relating to the vehicle control, could be used by hackers to attack the vehicles and manipulate important functions.

It is obvious in this case that the vehicles themselves cannot communicate with the vehicle-external server or the backend. In practice, it is always individual control devices installed in the vehicles that establish or maintain a connection to the backend. From the backend's point of view, however, it is primarily aware of entire vehicles, and not individual control devices installed in them, so it is more important for the backend to know for sure in which vehicle the control device with which it is currently communicating is installed than to know exactly which control device it is but not to know the associated vehicle.

Both standard methods (TLS, IPSec) are based on asymmetric cryptography, in particular on asymmetric private keys and certificates issued by a central trustworthy certificate authority (CA) for the associated public keys. The following requirements are important for secure communication between the vehicles and the backend:
- the certificates used by the vehicles or their control devices must be individual, i.e., each vehicle must have at least its own individual private key, and
- the associated certificate must be issued by a trusted central certification authority (CA) within the vehicle ecosystem to an individual vehicle identity, i.e., to the vehicle identification number (VIN), which is also referred to as the chassis number.

This private key should ideally be generated together with the associated public key in a secure hardware area (e.g., a hardware security module/HSM) of a control device located in the vehicle to which the certificate is to belong and should never leave this secure area of this control device. In this way, it can be ensured that the private key cannot in practice be determined by an attacker.

One obvious solution would be to entrust the manufacturer of the control device, which is to house the individual private key, with the task of generating a vehicle-individual pair of keys in this control device during its manufacture. Afterwards, the public key could be read out of the control device and a certificate created for it, whereby the private key cannot be read out and remains in the control device for its entire lifetime. However, this approach is problematic for two reasons.

Firstly, the identity of the vehicle for which the certificate is to be issued is not yet known at the time of manufacture of the control device, as it is not known at this time in which vehicle, i.e., in the vehicle with which identity, the OEM will later install the control device. Secondly, the control device is usually manufactured by a company other than the OEM. However, the vehicle-individual certificates for securing the communication between the vehicles and the OEM's own backend or other participants in the OEM's own vehicle ecosystem should be issued by the OEM itself and not by the control device manufacturer, inter alia in order to exclude a potential improper issuing of certificates by the control device manufacturer. It is possible in theory to securely connect an OEM's own certification authority (CA) to the production lines of the control device manufacturer, but this is an expensive solution.

The Applicant's laid-open specification DE 10 2009 009 310 A1 provides a method that enables secure communication between a user device having a vehicle control device and a remote backend over a publicly accessible network using digital certificates. This method comprises the steps of generating a non-specific certificate by the backend and sending the non-specific certificate to the control device, the control device also receiving and storing the non-specific certificate, and the control device subsequently establishing an initial connection with the backend using the non-specific certificate as an identifier. The initial connection is only accepted by the backend if the identifier is the non-specific certificate. Finally, a piece of vehicle identification information is requested by the backend and sent back to the backend by the control device. The backend then generates a specific certificate using the identification information and sends it to the control device. It is received and stored there. An encrypted working connection can then be established.

Due to the principles involved, the method presented in DE 10 2009 009 310 A1 has a number of disadvantages. Firstly, not only the individual vehicle certificate is generated by the certification authority but also the vehicle-individual pair of keys for which the certificate is issued. In particular, this also includes the vehicle-individual private key. This means that the vehicle-individual private key is not only available to the control device or vehicle that is to use it, but is also still known at least to the certification authority that generates it. Secondly, this key and the certificate must be transmitted from the issuing certification authority to the vehicle over a relatively insecure connection. This is because the vehicle does not yet have a secure individual certificate at this point. Furthermore, the certification authority can never be sure that it is actually transmitting the newly created vehicle-individual certificate, and in particular the individual private key that is worth protecting, to the vehicle with the correct identity. Rather, an unauthorized third party who merely fakes this identity could also be the requester or recipient of the certificate, as the requester or recipient cannot yet be reliably authenticated as this point due to the fact that the vehicle-individual certificate is not yet available.

Exemplary embodiments of the present invention therefore provide an improved method for securely equipping a vehicle with an individual certificate, which makes the prerequisites and procedures more secure.

As set out above, no certificate for an identity of the vehicle can be issued at the time of manufacture of the control device that is to house the vehicle-individual certificate and in particular also the vehicle-individual key, since this is not yet known. In the method according to the invention, a certificate for an identity of the control device is therefore issued at this time. This can be a certificate for a unique and forgery-proof, for example read-only, identity of the control device which, for example, has installed the hardware security module (HSM) in which the private key belonging to the vehicle-individual certificate is later to be securely stored.

In order to make this possible, the method according to the invention establishes a certification authority (CA) with a public key infrastructure (PKI) based in each case on an asymmetric pair of keys for both the vehicles and the control devices. The respective private key of the certification authority remains in the respective certification authority and the public keys are distributed to the participants in need of them. This includes, for example, the vehicle-external server, which is designed as the backend.

The control device can now be provided with initial cryptographic material, in particular during its manufacture, by generating a control device-individual pair of keys for the control device and transmitting the identity of the control device and its public key to the control device certification authority. The control device certification authority then generates a control device-individual certificate for the transmitted data using the private key of the control device certification authority, which certificate is introduced into the control device. The public key of the vehicle certification authority is stored in the control device in a tamper-proof manner and the vehicle identity belonging to the identity of the control device is determined and stored in a tamper-proof manner. The system is thus prepared for requesting and issuing a certificate in a very secure and simultaneously efficient manner. The vehicle, or more precisely a certain suitable control device installed in the vehicle, can thus be securely equipped with a vehicle-individual certificate issued to the vehicle identity.

According to a very advantageous embodiment of the method according to the invention, the type of the control device can also be transmitted to the control device certification authority. It is thus proposed to add to the control device-individual certificate the type of control device to which this control device belongs (e.g., head unit (HU), telematic communication unit (TCU), rear seat unit (RSU) etc.), if this type cannot be derived from the identity of the control device.

One advantageous development thereof also provides that the identity of the control device is entered into the control device-individual certificate as part of the subject and the type of control device is entered as an additional filed of the certificate, a so-called certificate extension. In this way it is possible that several control devices installed in the same vehicle can be issued with their own vehicle-individual certificate and that these different vehicle-individual certificates can be kept separate from the other side if necessary.

In order to determine the vehicle identity belonging to the identity of the control device, it can be provided in accordance with a very advantageous embodiment of the method according to the invention that a data packet consisting of the identification of the vehicle and the identification of the control device is recorded in a forgery-proof manner when the control device is installed in the vehicle and is then transmitted in a tamper-proof manner to the vehicle-external server which stores the data packet in a tamper-proof manner. According to an advantageous development of the idea, the type of the control device can also be entered into the data packet.

The device-individual private key and the device-individual certificate can then be used by the control device during runtime to transmit a certificate signing request (CSR) containing the vehicle-individual public key generated by the control device as part of the vehicle-individual pair of keys to the certification authority in a tamper-proof manner in accordance with an extremely important and advantageous development of the method according to the invention, in order to then receive a vehicle-individual certificate from the certification authority, whereby the vehicle-individual private key never has to leave the control device.

For this purpose, the control device can determine the identity (FzgID) of the vehicle in which it is installed and generate the vehicle-individual pair of keys for an individual vehicle certificate in a secure environment of the control device. The vehicle-individual private key remains in the secure environment. The certificate signing request (CSR) for at least the identity of the vehicle and the vehicle individual public key, and according to a very favorable development also the type of the control device, is generated. Furthermore, a signature is generated by signing the certificate signing request with the control device-individual private key, after which the data packet generated in this way, together with the control device-individual certificate, is sent to the vehicle-external server. The server receives the data packet and checks the correctness of the received control device-individual certificate using the public key of the control device certification authority stored therein. Subsequently, the correctness of the signature of the data packet is checked using the public key of the control device that is contained in the control device-individual certificate which is also sent.

The vehicle-external server then extracts the identity of the vehicle from the certificate signing request and the identity of the control device from the control device-individual certificate as well as the type of control device according to an advantageous embodiment. It then checks whether an entry has been stored for this data, and if one of these checks fails, the process is aborted by the vehicle-external server. Otherwise, the vehicle-external server sends the certificate signing request for the identity of the vehicle and the vehicle-individual public key over a protected transmission path to the vehicle certification authority which issues a vehicle-individual certificate signed with its private key on the basis of the certificate signing request and transmits this back to the vehicle-external server.

The vehicle-external server then transmits the vehicle-individual certificate to the control device installed in the vehicle, wherein the control device checks the received vehicle-individual certificate by at least checking the correctness of the signature of the vehicle-individual certificate with the public key and verifying whether the received vehicle-individual certificate corresponds to the sent certificate signing request, i.e., whether the identity of the vehicle and the vehicle-individual public key match in both data formats. The vehicle-individual certificate is now stored locally in the event of a positive check. It is thus available for future communication and can be renewed as needed in the way described.

The vehicle-individual private key is therefore generated within the control device and never leaves it, which represents a decisive advantage and security gain compared to the state of the art. In particular, it does not have to be transmitted over a relatively insecure communication channel from the vehicle-external server or backend to vehicle. Another advantage is that the vehicle-external server can assume with a high degree of certainty that the certificate requester is the vehicle for which the certificate is actually to be issued.

A very advantageous embodiment of this variant of the method according to the invention also provides for the control device-individual and/or vehicle-individual pair of keys to be generated by the control device and the control device-individual and/or vehicle-individual private key to then be stored securely and not leave the control device. This ensures a high level of security, especially if this is done for both types of key.

Preferably, it can be provided that the respective individual pair of keys is generated by the control device in a hardware security module (HSM) and/or is at least securely stored there, and that it does not leave the hardware security module. This again preferably applies to both types of key, but is particularly important for the vehicle-individual private key and is of particular security benefit.

An extremely advantageous development of the method according to the invention also provides for a forgery-proof individual digital vehicle fingerprint to be recorded during the manufacture of the vehicle and for the data packet having the identity of the vehicle and the vehicle fingerprint to be transmitted in a tamper-proof manner to the vehicle-external server and to be stored therein in a tamper-proof manner. When creating the certificate signing request, the control device determines its own control device-specific vehicle fingerprint by collecting the information necessary therefor in the vehicle, after which the signature is generated by the data packet comprising the control device-specific vehicle fingerprint being signed with the control device-individual private key. Instead of the data packet described above, the data packet thus generated, enhanced by the device-specific vehicle fingerprint, is then transmitted to the vehicle-external server and processed further there.

Further advantageous embodiments of the method according to the invention also result from the remaining dependent subclaims and become clear from the exemplary embodiment which is described in more detail below with reference to the FIGURE.

BRIEF DESCRIPTION OF THE SOLE DRAWING

The sole FIGURE shows an illustration of a schematic diagram for explaining the method according to the invention.

DETAILED DESCRIPTION

The schematic diagram of the sole FIGURE shows an illustrated vehicle 1 twice, namely once during manufacture labelled 1' and once during operation labelled 1". A control device 2 is also shown several times, once labelled 2' during manufacture, a further time labelled 2" in the vehicle 1' during manufacture thereof and a further time in the vehicle 1" during operation. The control device 2 is then labelled 2" there. In addition, a vehicle-external server 3 is shown, e.g., a backend server of the respective OEM, a control device certification authority GCA and a vehicle certification authority FCA.

The following steps are now carried out in detail, the paragraph numbers of which can also be found in the FIGURE:

A: Setting up a vehicle infrastructure for public keys, a so-called public key infrastructure (PKI) for vehicle-individual certificates. This is done once for each vehicle fleet.
  1. An asymmetric pair of keys FzgRootPub, FzgRootPriv, which can also be referred to as a vehicle-root pair of keys, is generated for a vehicle certification authority or vehicle CA FCA.
  2. The private key FzgRootPriv is stored in the FCA in a secure environment and used by the FCA to issue/sign vehicle-individual certificates.
  3. The public key FzgRootPub is distributed to all systems which should be able to check certificates issued by the FCA, for example to the backend 3.

B: Setting up a control device infrastructure (PKI) for control device-individual certificates. This is done once per control device manufacturer and a certain quantity of control devices to be produced by this manufacturer.
  1. An asymmetric pair of keys GerRootPub, GerRootPriv is generated for a control device certification authority or control device CA GCA.
  2. The private key GerRootPriv is stored in the GCA in a secure environment and used by the GCA to issue/sign control device-individual certificates.
  3. The public key GerRootPub is distributed to all systems which should be able to check certificates issued by the GCA, for example to the backend 3

C: Setting up the control device 2 with initial cryptographic material, in particular with a control device-individual certificate. This is done once per control device 2 with the individual identity GerID, the type GerTyp, for example during the manufacture thereof. The control device 2 is labelled 2' there in the FIGURE.
  1. A control device-individual pair of keys GerIndPub, GerIndPriv is generated for the control device having the identity GerID, preferably in a hardware security module (HSM) installed in this control device 2.
  2. If the pair of keys is generated in the control device 2, the private key GerIndPriv remains there. If the pair of keys is generated outside of the control device 2, then GerIndPriv is introduced into the control device 2 in the most secure way as possible and does not leave the latter again.
  3. The identity GerID, the control device type GerTyp and the public key GerIndPub are transmitted to the GCA, where a certificate GerIndCert is generated for this data GerID, GerIndPub, and GerTyp using GerRootPriv, whereby GerID, for example, is included as part of the subject and GerType, for example, as an additional field ("extension") in the certificate GerIndCert, Subsequently, the data as a whole is signed with GerRootPriv.
  4. GCA transmits GerIndCert back to the control device 2 where it is stored.
  5. FzgRootPub, the public key of FCA, is stored in the control device in a tamper-proof manner.

D: Recording the vehicle identity FzgID and a vehicle fingerprint FzgFA. This is done once per control device 2 of the type GerTyp with the identity GerID, when it is installed in a vehicle 1 with the identity FzgID, for example during vehicle manufacture at the OEM.
  1. When a control device 2 with GerID of the type GerTyp is installed in a vehicle 1 with FzgID, the data packet FzgID, GerTyp, GerID is recorded in a forgery-proof manner and then transmitted in a forgery-proof manner to the OEM's own backend 3.
  2. The backend 3 stores the data packet FzgID, GerTyp, GerID in a tamper-proof manner.

3. During production of the vehicle 1, a forgery-proof individual digital fingerprint FzgFA of the vehicle 1 is recorded in a secure environment and the data packet FzgID, FzgFA is transmitted to the backend 3 in a tamper-proof manner.
4. The vehicle fingerprint FzgFA can include a wide range of individual vehicle data, e.g., individual identities of various control devices installed in the vehicle, preferably also data that is not documented back, so that it cannot easily be reproduced manually.
5. The vehicle fingerprint FzgFA must be designed in such a way that it can be at least partially "reproduced" by a control device 2 installed in a vehicle 1 during its operation by collecting the data flowing into the vehicle fingerprint FzgFA from other control devices installed in the vehicle 1, for example via the various vehicle buses.
6. The backend 3 stores the data packet FzgID, FzgFA in a tamper-proof manner.

E: If the vehicle 1 requires a certificate or a new certificate from the point of view of the control device 2, the following steps are carried out.
1. The control device 2
   a. determines its control device-specific fingerprint FzgFAGerSpez, by collecting the necessary information,
   b. determines the identity FzgID of the vehicle in which it is installed,
   c. generates a pair of keys FzgIndPub, FzgIndPriv in a secure environment for the vehicle-individual certificate FzgIndCert for the vehicle 1 with the identity FzgID, with the vehicle-individual private key FzgIndPriv remaining in the secure environment,
   d. creates a certificate signing request (CSR) for FzgID, FzgIndPub and GerTyp,
   e. generates the signature Sign, by signing the data packet (CSR (FzgID, FzgIndPub, GerTyp), FzgFAGerSpez) with the control device-individual private key GerIndPriv,
   f. sends the data packet ((CSR (FzgID, FzgIndPub, GerTyp), FzgFAGerSpez), Sign, GerIndCert (GerID, GerIndPub, GerTyp)) to the backend 3.
2. The backend 3 receives the data packet and
   a. checks the correctness of the control device-individual certificate GerIndCert using the public key of the control device certification authority GCA GerRootPub that is stored therein,
   b. checks the correctness of the signature Sign of the data packet using the public key GerIndPub contained in the control device-individual certificate GerIndCert which is also sent,
   c. extracts the vehicle identity FzgID from the CSR, extracts the identity GerID and the control device type GerTyp of the control device 2 from the control device-individual certificate GerIndCert and checks whether an entry for FzgID, GerTyp, and GerID has been stored in the backend 3,
   d. checks whether an entry FzgID, FzgFA has been stored for the identity FzgID of the vehicle 1,
   e. checks whether the control device-specific vehicle fingerprint FzgFAGerSpez contained in the received message matches the general vehicle fingerprint FzgFA,
   f. aborts the process if one of the above checks fails,
   g. otherwise, it sends the CSR (FzgID, FzgIndPub, GerTyp) for the vehicle identity FzgID and the public key FzgIndPub over a protected channel to the vehicle-CA FCA
   h. the FCA issues a vehicle-individual certificate FzgIndCert signed with FzgRootPriv based on the CSR (FzgID, FzgIndPub, GerTyp) for the vehicle identity FzgID and the public key FzgIndPub, and
   i. the FCA sends the vehicle-individual certificate FzgIndCert back to the backend 3,
   j. this sends the vehicle-individual certificate FzgIndCert to the control device 2 installed in the vehicle 1.
3. The control device 2
   a. checks the received certificate FzgIndCert, i.e.,
      i. it checks the correctness of the certificate with FzgRootPub
      ii. it checks whether the received certificate corresponds to the sent CSR, i.e., whether FzgID, FzgIndPub, GerTyp match in both data formats
   b. stores the vehicle-individual certificate FzgIndCert locally.
4. From now in, the control device 2 with the identity GerID is in possession of a vehicle-individual certificate FzgIndCert issued to the vehicle identity FzgID and the associated vehicle-individual private key FzgIndPriv and can securely perform the tasks assigned to this control device 2 by the vehicle 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for securely equipping a vehicle with an individual certificate, wherein the vehicle has a control device and has a communication unit configured to establish a connection as required between the control device and a vehicle-external server, wherein the control device and the vehicle-external server have an asymmetric cryptographic mechanism for secure authentication, the method comprising:

establishing a vehicle certification authority having a vehicle infrastructure for public keys based on an asymmetric pair of keys of the vehicle certification authority;

maintaining a private key of the asymmetric pair of keys of the vehicle certification authority in the vehicle certification authority;

distributing a public key of the asymmetric pair of keys of the vehicle certification authority to participants requiring the public key of the asymmetric pair of keys, establishing a control device certification authority having a control device infrastructure for public keys based on an asymmetric pair of keys of the control device certification authority;

maintaining a private key of the asymmetric pair of keys of the control device certification authority in the control device certification authority;

distributing the public key of asymmetric pair of keys of the control device certification authority to the participants;

equipping the control device with initial cryptographic material by a control device-individual pair of keys generated for the control device and an identity of the control device;

transmitting a public key of the control device-individual pair of keys to the control device certification authority, after which a control device-individual certificate is generated in the control device certification authority for the transmitted data using the private key of the control device certification authority, after which the control device-individual certificate is transmitted back to the control device and stored in a tamper-proof manner in the control device, wherein the public key of the asymmetric pair of keys of the vehicle certification authority is stored in the control device in a tamper-proof manner.

2. The method of claim 1, wherein a type of the control device is also transmitted to the control device certification authority.

3. The method of claim 2, wherein the identity of the control device is entered into the control device-individual certificate as part of a subject and the type of the control device is entered as an additional field, and wherein the control device-individual certificate, including the subject and the type of the control device, is signed with the private key of the control device certification authority.

4. The method of claim 2, wherein in order to determine a vehicle identity belonging to the identity of the control device, a data packet consisting of the vehicle identity and the identification of the control device is recorded in a forgery-proof manner when the control device is installed in the vehicle and is then transmitted in a tamper-proof manner to the vehicle-external server, which stores the data packet in a tamper-proof manner.

5. The method of claim 4, wherein the type of the control device is also entered into the data packet.

6. The method of claim 4, to request a first or new certificate, the method further comprises:

determining, by the control device, the identity of the vehicle in which it is installed;

generating, in a secure environment of the control device, a vehicle-individual pair of keys for an individual vehicle certificate and maintaining a vehicle-individual private key of the vehicle-individual pair of keys in the secure environment of the control device, after which creating a certificate signing request for at least the identity of the vehicle and the vehicle-individual public key, after which generating a signature by signing a certificate signing request with a control device-individual private key of the control device-individual pair of keys and sending a data packet containing the signed certificate request to the vehicle-external server;

receiving, by the vehicle-external server, the data packet and then using the public key of the control device certification authority stored in the vehicle-external server to check correctness of the control device-individual certificate, extracting, by the vehicle-external server, the identity of the vehicle from the certificate signing request and the identity of the control device from the control device-individual certificate and checking whether an entry for the identity of the vehicle and the identity of the control device has been stored, wherein if there is not an entry for the identity of the vehicle or for the identity of the control device, the method is aborted by the vehicle-external server, after which the vehicle-external server checks correctness of the signature of the received data packet using the public key of the control device that is contained in the control device-individual certificate which is also sent, if there is an entry for the identity of the vehicle and for the identity of the control device, the vehicle-external server sends the certificate signing request) for the identity of the vehicle and the vehicle-individual public key over a protected transmission path to the vehicle certification authority, which issues a vehicle-individual certificate signed with the private key based on the certificate signing request) for the identity of the vehicle and the vehicle-individual public key and transmits the signed vehicle-individual certificate back to the vehicle-external server, after which the vehicle-external server transmits the vehicle-individual certificate to the control device installed in the vehicle, wherein the control device checks the received vehicle-individual certificate by at least checking the correctness of the signature of the vehicle-individual certificate with the public key and verifying whether the received vehicle-individual certificate corresponds to the sent certificate signing request, which confirms that at least the identity of the vehicle and the vehicle-individual public key match in both data formats, after which the vehicle-individual certificate is stored locally.

7. The method of claim 6, wherein the control device-individual pair of keys is generated by the control device and the control device-individual private key is then stored securely and does not leave the control device.

8. The method of claim 7 wherein the vehicle-individual pair of keys is generated by the control device and the vehicle-individual private key is then stored securely and does not leave the control device.

9. The method of claim 1, wherein the control device-individual pair of keys and the vehicle-individual pair of keys are generated by the control device in a hardware security module or are at least securely stored in the hardware security modile and the private keys of the control device-individual pair of keys and the vehicle-individual pair of keys do not leave the hardware security module thereafter.

10. The method of claim 9, wherein a forgery-proof individual digital vehicle fingerprint is recorded during the manufacture of the vehicle and a data packet having the identity of the vehicle and the vehicle fingerprint is transmitted in a tamper-proof manner to the vehicle-external server and is stored in the vehicle-external in a tamper-proof manner, when creating the certificate signing request, the control device determines its own control device-specific vehicle fingerprint by collecting information in the vehicle, after which the signature is generated by the data packet comprising the control device-specific vehicle fingerprint being signed with the control device-individual private key, after which, the generated data packet, enhanced by the control device-specific vehicle fingerprint, is transmitted to the vehicle-external server and is processed by the vehicle-external server.

11. The method of claim 10, wherein when creating the certificate signing request, the following are performed:
creating the vehicle-individual certificate;
extracting data from the certificate signing request, checking the certificate signing request, accounting for the type of control device.

* * * * *